United States Patent [19]

Bowie, Jr.

[11] Patent Number: 5,620,607

[45] Date of Patent: Apr. 15, 1997

[54] FILTERING FLUIDIZED BED REACTOR

[76] Inventor: James E. Bowie, Jr., 110 Viator Dr., Lafayette, La. 70506

[21] Appl. No.: 454,438

[22] Filed: May 30, 1995

[51] Int. Cl.$^6$ .................... C02F 1/52; C02F 1/72
[52] U.S. Cl. .................... 210/702; 210/712; 210/721; 210/793; 210/795; 210/805; 210/807
[58] Field of Search .................... 210/715, 712, 210/702, 721, 792, 793, 794, 795, 617, 805, 807

[56] References Cited

U.S. PATENT DOCUMENTS

| | | | |
|---|---|---|---|
| 2,272,026 | 2/1942 | Spaulding | 210/715 |
| 3,550,774 | 12/1970 | Hirs et al. | 210/792 |
| 3,579,443 | 5/1971 | Horst | 210/715 |
| 3,737,039 | 6/1973 | Hirs | 210/792 |
| 3,846,289 | 11/1974 | Jeris et al. | 210/617 |
| 3,869,381 | 3/1975 | Graveland et al. | 210/715 |
| 4,009,099 | 2/1977 | Jeris | 210/151 |
| 4,009,105 | 2/1977 | Jeris | 210/151 |
| 4,357,242 | 11/1982 | Chandler | 210/712 |
| 4,378,295 | 3/1983 | Axtmann | 210/792 |
| 4,389,317 | 6/1983 | Trentelman | 210/715 |
| 4,496,464 | 1/1985 | Hensley | 210/807 |
| 4,515,697 | 5/1985 | Elmaleh et al. | 210/715 |
| 4,582,600 | 4/1986 | Atkinson et al. | 210/151 |
| 4,764,284 | 8/1988 | Jansen | 210/715 |
| 4,787,987 | 11/1988 | Hensley | 210/807 |
| 4,826,609 | 5/1989 | Hensley | 210/807 |
| 4,954,259 | 9/1990 | Elmaleh et al. | 210/715 |
| 4,994,332 | 2/1991 | Coin et al. | 210/712 |
| 5,019,268 | 5/1991 | Rogalla | 210/617 |
| 5,114,595 | 5/1992 | Hensley | 210/792 |
| 5,156,746 | 10/1992 | Maree et al. | 210/712 |
| 5,266,211 | 11/1993 | Breuker et al. | 210/712 |
| 5,290,458 | 3/1994 | Bratten | 210/792 |

OTHER PUBLICATIONS

"Developments In Water Softening By Means Of Pellet Reactors;" A. Graveland, et al; *Journal AWWA*; Dec., 1983; pp. 619–625.

"Central Softening by Crystallization in a Fluidized-Bed Process;" A. Graveland, et al; *Journal AWWA*; Jun., 1988; pp. 51–58.

"Water Purification By Fluidized Bed Technique;" C.M.A. Ademoroti, University of Benin, Benin City, Nigeria; *Water Research*; vol. 20, No. 9; Sep., 1986; pp. 1105–1109.

"Softening By Fluidized Bed Crystalizers;" W. Harms, et al; *Journal of Environmental Engineering Division, ASCE* (*American Society of Civil Engineers*); Aug., 1992; pp. 513–529.

*Primary Examiner*—Cynthia L. Nessler
*Attorney, Agent, or Firm*—C. Dean Domingue

[57] ABSTRACT

A novel process for treating a fluid is disclosed. Generally, the process utilizes a novel fluidized bed reactor and down flow filter. The process includes filling the reactor, and thereafter fluidizing the media bed contained therein. A catalyst is added, and the entire batch fluid is allowed to react with the catalyst. After appropriate settling of the media bed, the batch fluid is recycled. A filtration step is then included and appropriate disposition of the collected filtrate may be effected.

14 Claims, 9 Drawing Sheets

FILTERING FLUIDIZED BED REACTOR

BACKGROUND OF THE INVENTION

The invention relates to a method of filtering fluids. More particularly, but not by way of limitation, the invention relates to a method and apparatus to cause filtering and fluidized bed reaction to occur in the same vessel.

While water is composed of two hydrogen atoms bonded to an oxygen atom (H2O), other elements are many times found associated with a batch of water such as the divalent cations of calcium (Ca) and magnesium (Mg). When these minerals are present in the water, the water is often referred to as being hard. In order to make the water more desirable for consumption and use, the hard water is softened, as is understood by those of ordinary skill in the art to be removing of the ions of Ca and Mg from the water. In addition to minerals such as Ca and Mg, a batch of water may contain hazardous compounds which are undesirable for consumption, indigestion and/or synthesis by animal and plant life.

Many prior art methods have been devised in order to treat water solutions. One popular technique is to utilize a media bed through which continuously flows the water to be treated. A chemical is continuously added to the water to be treated. The chemical is chosen that will react with the impurities already dissolved in the water and cause a reaction to occur with the media.

Prior art methods include utilizing a separate vessel with a filter bed disposed therein in order to filter the water of the precipitants and any further impurities. By the use of a separate filtering vessel, the process becomes time consuming. Also, the amount of equipment and space required with the prior art methods is significant. Moreover, the prior art methods prove to be costly due to the extra amount of equipment, space and time required.

Thus, there is a need for a method and device to cause filtering and fluidized bed reaction to occur in a single vessel thereby eliminating time, space and providing for a more cost effective process. There is also a need to provide for a method of treating water solutions that will effectively remove undesirable minerals and hazardous compounds.

SUMMARY OF THE INVENTION

A process for removing impurities or treating a fluid and filtering the fluid is disclosed. Generally, the process comprises the step of providing a media bed contained within a vessel reactor. The vessel reactor will have associated therewith pump means for pumping the fluid through the vessel reactor. The pump means, in the preferred embodiment, may comprise a fluidization pump attached to the bottom portion of the vessel; a chemical feed pump attached to the vessel; and, a recirculation pump having an inlet attached to the bottom portion and an outlet attached to the top portion of the vessel.

The process would include furnishing the vessel with a batch of fluid to be treated. Next, the batch fluid is circulated utilizing the fluidization pump wherein the fluidization pump is attached to the bottom of the vessel. The pump is forcing the batch fluid at a rate sufficient to fluidize the media bed. Next, the batch fluid is collected at the top of the vessel, and thereafter, the circulated batch fluid is delivered to the fluidization pump means for continued circulation within the vessel.

The process further comprises the steps of injecting a chemical solution or other reactants into the vessel utilizing the chemical feed pump. The chemical solution is chosen such that a reaction occurs with the batch fluid when mixed and certain products result from the reaction in the batch fluid. The fluidized bed must interact with the reactants and products in the reaction. In pellet softening, it serves as a surface for crystallization. The fluidized bed could also serve as a catalyst for a reaction. Next, the circulation is terminated by stopping the fluidization pump and the media bed particles are allowed to settle so that a filter bed is formed within the vessel.

The process would then include the steps of activating the recirculation pump and circulating the fluid within the vessel. As part of the process, the batch fluid is collected at the inlet of the recirculation pump located at the bottom of the vessel. Then, the batch fluid is discharged from the outlet of the recirculation pump and the batch fluid is delivered to the top portion of the vessel.

The process further consist of terminating the recirculation pump and draining the batch fluid from the vessel by opening a valve located at the bottom portion of the vessel. In one embodiment, the step of draining the batch fluid includes attaching a pressure means for delivering an air pressure to the vessel and thereafter pressuring the vessel from the top so that the batch fluid is forced from the bottom portion.

In accordance with the teachings of the present invention, it is possible to remove the excess residue from the media bed from time to time. In such a case, the vessel also has associated therewith a backwash pump. The process would further comprise the steps of providing a cleaning solution operatively associated with the backwash pump, and then injecting the cleaning solution at the bottom portion of the vessel. The process would next include circulating the cleaning solution within the vessel and recovering the cleaning solution at the top portion of the vessel.

A feature of the present invention includes having a vessel that may serve as a site for a chemical reaction of the batch fluid with a chemical catalyst and media bed. The fluidized bed must interact with the reactants and products in the reaction. In pellet softening, it serves as a surface for crystallization. The fluidized bed could also serve as a catalyst for a reaction. Another feature is that the same vessel is used as the site for filtering. Yet another feature includes utilization of pumping means in order to fluidize the media particles within batch fluid. Still yet another feature is that pumping means are utilized for addition of the chemical and the recirculation of the filtrate.

An advantage of the present invention includes the steps of reaction and filtering takes place in the same vessel. Another advantage is that less equipment is required in order to effectively react or treat and then filter a batch of fluid. Yet another advantage is that the filtering of the batch fluid can be done quicker and at less cost than prior art processes.

Yet another advantage is that multiple filtering fluidized bed reactors may be used in order to increase the output of treated fluid. Although there may be multiple filtering fluidized bed reactors, each media bed will serve as a filter and as a fluidized bed reactor. Another advantage is the media bed is used both as a fluidized bed reactor and as a down flow filter. This is accomplished by flow reversal after fluidization and draining of the bed.

DESCRIPTION OF THE PREFERRED EMBODIMENTS

Figure 1:
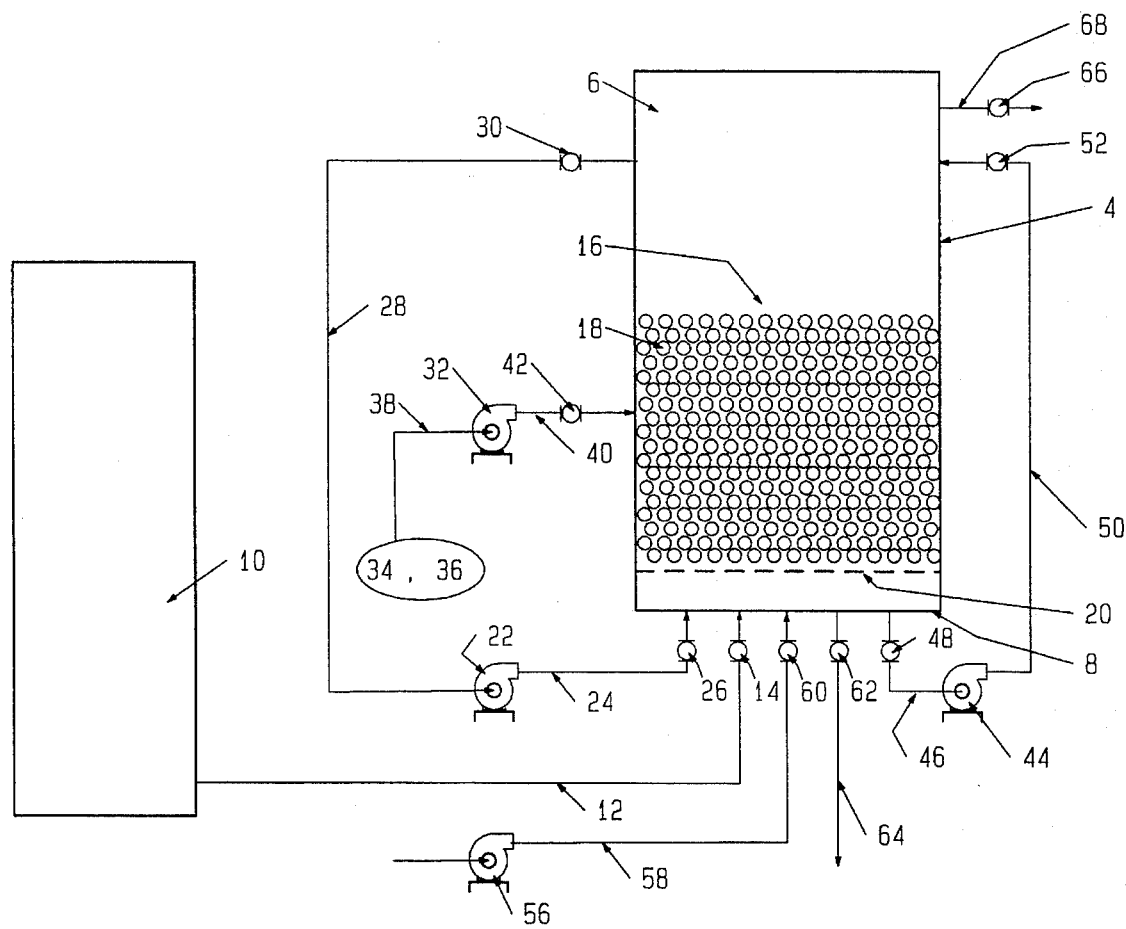
FIG. 1 is a schematic of the vessel reactor and associated components of the present invention.

Referring now to FIG. 1, the preferred embodiment of the present invention is illustrated. Generally, the system 2 consist of a vessel reactor 4 (hereinafter referred to as "reactor") that has a top portion 6 and a bottom portion 8. The fluid which is to be treated is generally held within the holding tank 10 and is delivered to the reactor 4 via the flow line 12. A fixed quantity or batch of fluid will be introduced to the reactor, then reacted with some chemical across a fluidized bed then filtered as will more fully be set out later in the application.

A valve means 14 having an open position and a closed position for providing communication of the flow line 12 with the reactor 4 is provided. It should be noted that the fluid within the holding tank 10 may be pumped (not shown) or gravity filled.

The vessel will have contained therein a media bed 16 composed of individual media particles 18. The media is granular or particulate substance which is used as a filter media. In the preferred embodiment, the media bed 16 is a silica sand with a grain size between 40 and 60 mesh. The reactor 4 is known as the reactor 4 since it acts as the site of a chemical reaction which will be discussed in greater detail later in the application.

The vessel will also have disposed therein a media support and flow distribution system 20 which in the preferred embodiment is a wire mesh screen capable of bridging the media particles. The media support 20 forms a barrier the keeps the media bed 16 from the series of valve means to be described later in the application.

The invention will also include pump means for pumping the fluid through reactor 4. A single pump means maybe used in order to circulation, add chemical and recycle. However, in the preferred embodiment, a fluidization pump, a chemical feed pump and recirculation pump means will be utilized as will be more fully set out hereinafter. As seen in FIG. 1, the system 2 will have associated therewith a fluidization pump means 22 for pumping the fluid within the vessel so that the media particles 18 are fluidized. The flow is in an upward direction, as will be seen in FIG. 2. The media bed is fluidized when the up flow velocity through the bed is sufficient to cause the media particles 18 (also referred to as media grains) to be suspended in the fluid. The tendency of the media particles 18 to settle is balanced by the fluid drag on the particles 18 and the particles 18 are suspended in the fluid.

The fluidization pump means 20 will have connected thereto at the output the flow line 24, with the flow line 24 being connected to the valve means 26. The valve means 26 has an open position and a closed position for providing communication of the flow line 24 with the bottom portion of the vessel 2. On the inlet side of the fluidization pump means 22, a flow line 28 is provided, with the flow line 28 having disposed therein a valve means 30. The valve means 30 has an open position and a closed position for providing communication of the flow line 28 with the top portion of the vessel 2.

A chemical feed pump means 32 for pumping/injecting a chemical(s) 34 (contained within the chemical tank 36) into the vessel 2 is also provided. The media is integral to the reaction, with the media bed 16 serving as a catalyst or as a surface for plating out the reaction products. The types of chemicals that may be used include precipitants (calcium hydroxide or sodium hydroxide), oxidants (chlorine or potassium permanganate), or other chemicals as future needs arise. Due to the chemical reaction that takes place with the addition of the chemical 34, some chemical change is caused to occur in the batch fluid.

The chemical feed pump means 32 will have an input line 38 connected thereto, with the input line 38 being attached to the chemical tank 36. On the output side of the chemical feed pump means 32 will be the output line 40, with the output line having associated therein valve means 42. The valve means 42 has an open position and a closed position for providing communication of the output line 40 with the vessel 2. As shown, the outline line enters at the mid-section of the vessel.

The system also contains a recirculation pump means 44 for pumping the fluid within the vessel in a reverse circulation, as will be more fully set forth later in the application. The recirculation pump means 44 will have an input line 46 connected thereto, with the input line 46 having disposed therein a valve means 48. The valve means 48 has an open position and a closed position for providing communication of the input line 46 with the vessel 2.

An output line 50 is included that leads from the recirculation pump means 44 to the top portion of the reactor 4, with the output line 50 having disposed therein a valve means 52. The valve means 52 has an open position and a closed position for providing communication of the output line 50 with the reactor 4.

The invention herein described may also contain a back wash pump means 56 for the pumping a cleaning fluid through the reactor 4 after the fluidized bed reaction and filtering has been completed. Since the filter retains any solids generated during the reaction, it may be necessary to remove the excess residue from the media bed from time to time.

The back wash pump means 56 will have an output flow line 58, with the output flow line 58 being connected to the valve means 60. The valve means 60 has an open position and a closed position for providing communication of the output line 58 with the bottom portion of the reactor 4. The back wash pump means 56 will have an input side associated with a washing or cleaning fluid tank (not shown).

The reactor 4 will also have associated the valve means 62 having an open position and a closed position for allowing the draining of the fluid within the reactor 4. As shown, valve means 62 is connected to the bottom portion of the reactor 4 and has flow line 64 extending therefrom. Additional valve means 66 is also provided, with the valve means 64 having an open position and a close position for allowing the draining of fluid that is contained within the reactor 4. A flow line 68, which extends from the top portion of the reactor 2, is operatively connected to the valve means 66.

Figure 2:
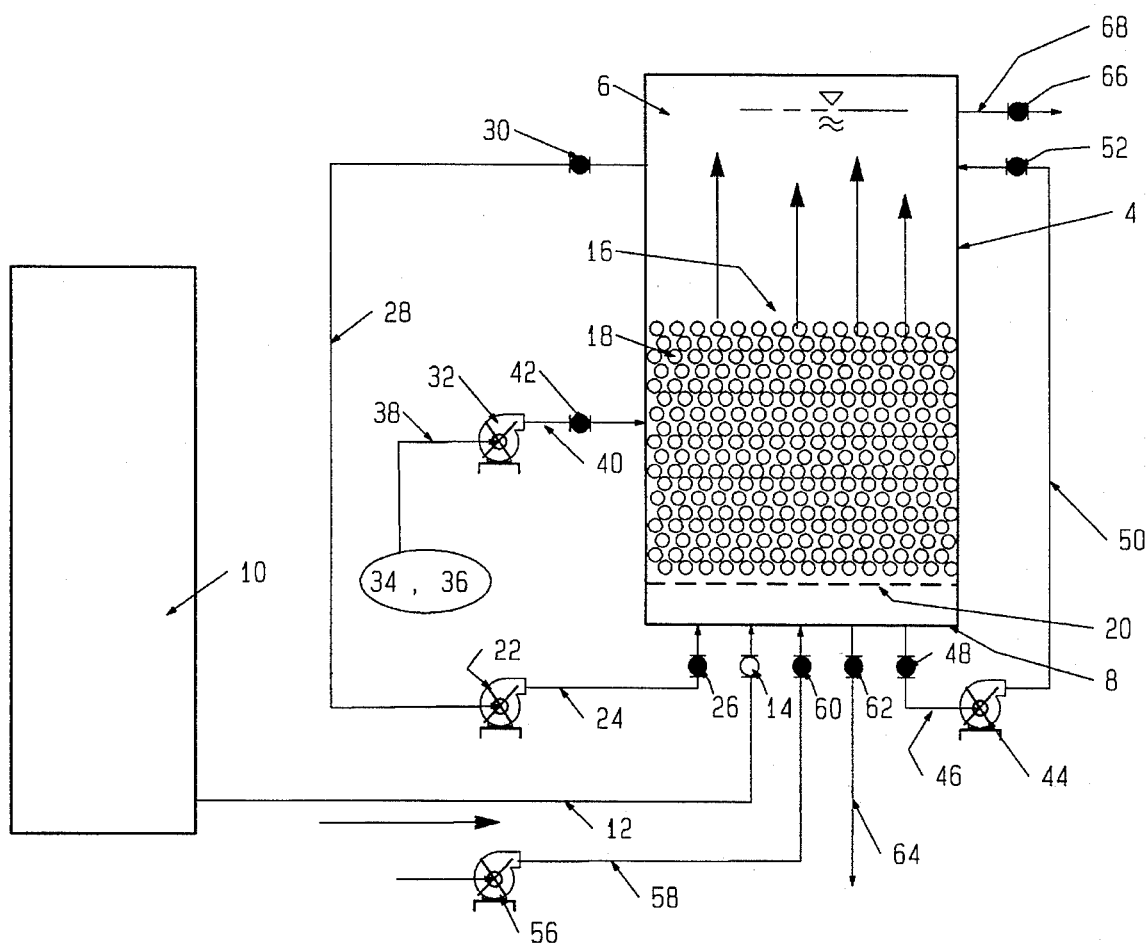
FIG. 2 is the schematic of FIG. 1 showing the vessel being filled.

OPERATION:

The operation of the present invention will now be described. In particular, FIG. 2 illustrates the filling of the empty reactor 4. In this mode of operation, the valve means 14 is opened and the fluid within the holding tank 10 either gravity filled or pumped into reactor 4. The valve means 26, 60, 62, 48, 30, 42, 52, and 66 are closed. It should be noted that the reactor 4 will have already placed within the media bed 16.

Figure 3:
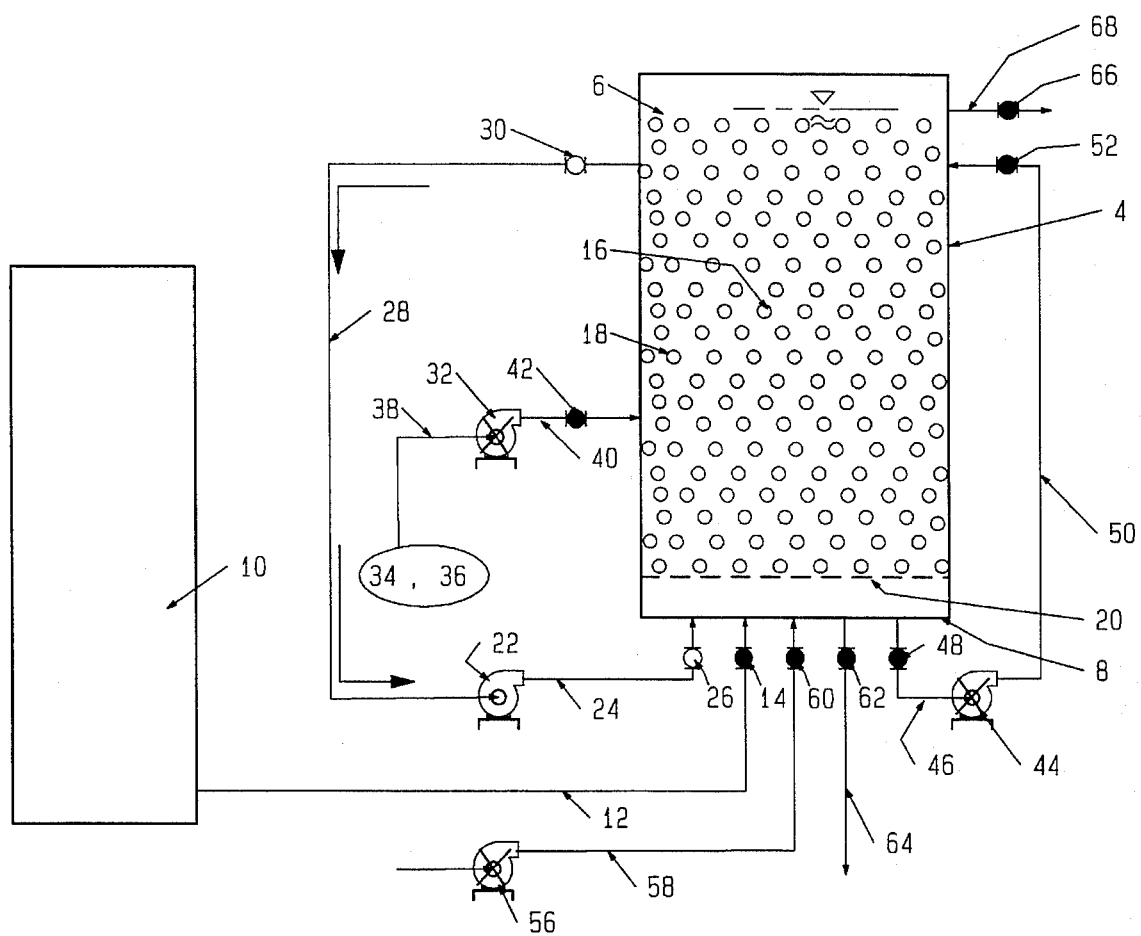
FIG. 3 is the schematic of FIG. 2 showing the media bed fluidized.

Next, the batch of fluid in the reactor 4 is circulated as shown in FIG. 3. This may be accomplished by opening valve means 26 and 30, and closing the remainder of the valve means 14, 60, 62, 48, 42, 52, and 66. During this step, the fluidization pump means 22 will be activated. Thus, circulation is from the bottom portion of the reactor 4 to the top portion of the reactor 4. The rate of flow is sufficient to fluidize the bed media bed 16 so that the individual grains 18 are suspended in the flow field. To suspend a bed of 0.45 mm sand requires 6.3 gpm over 0.177 ft$^2$.

Figure 4:
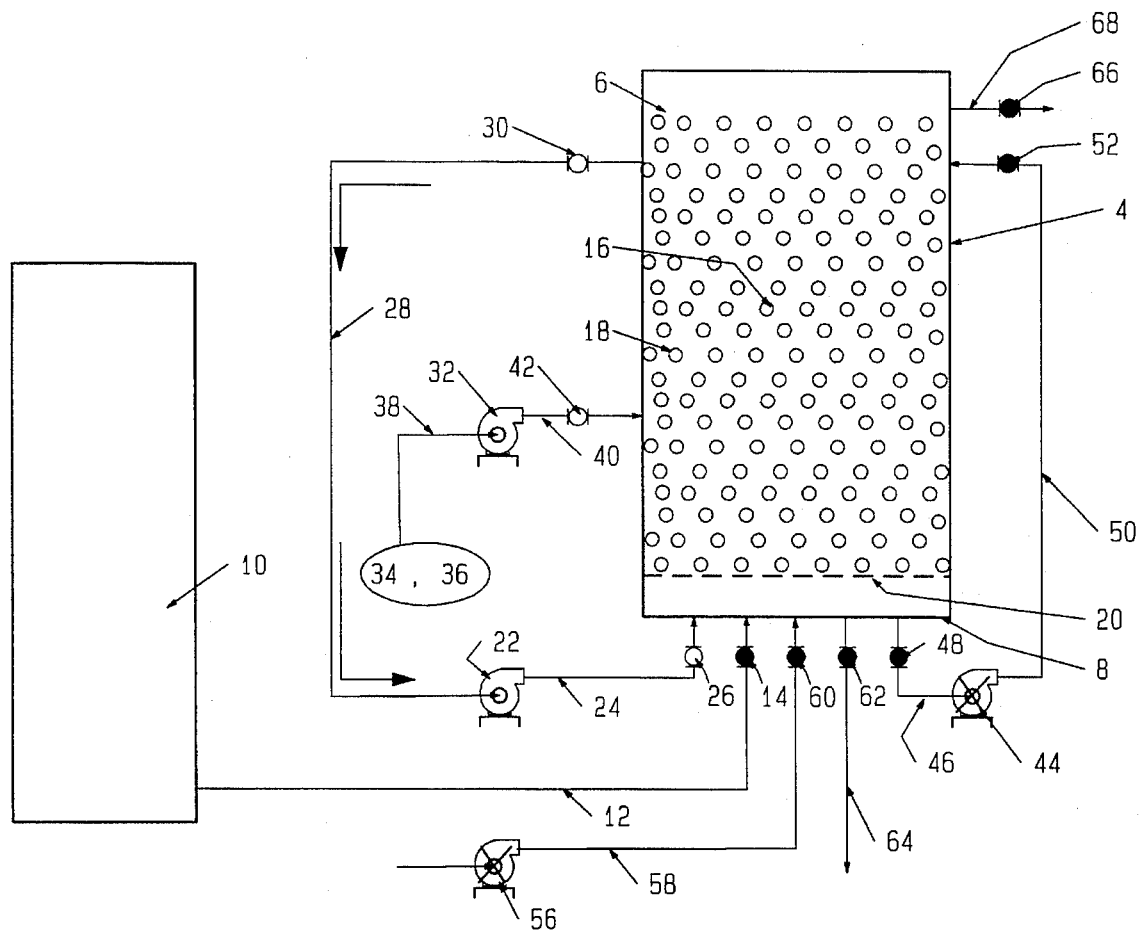
FIG. 4 is the schematic of FIG. 3 depicting the chemical addition into the vessel.

The process further includes the addition of a chemical 34 in order to cause a reaction between the minerals in the batch fluid and the chemical 34, as seen in FIG. 4. Generally, the type of chemical 34 that may be added includes precipitants (Calcium hydroxide or sodium hydroxide), oxidants (chlorine or potassium permanganate), or other chemicals as future needs arise. The media bed 16 is integral to the reaction, serving as a catalyst or as a surface for plating out the reaction process. Some chemical change is caused to occur in the batch of fluid within the reactor 4.

The addition of the chemical 34 is caused by the closing of the valves 14, 60, 62, 48, 52, and 66. The valve means 26 and 30 are opened, and the fluidization pump 22 is continuing to pump. Next, the chemical feed pump means 32 begins pumping the chemical 34 from the chemical tank 36 via lines 38, 40 for introduction into the reactor 4.

Figure 5:
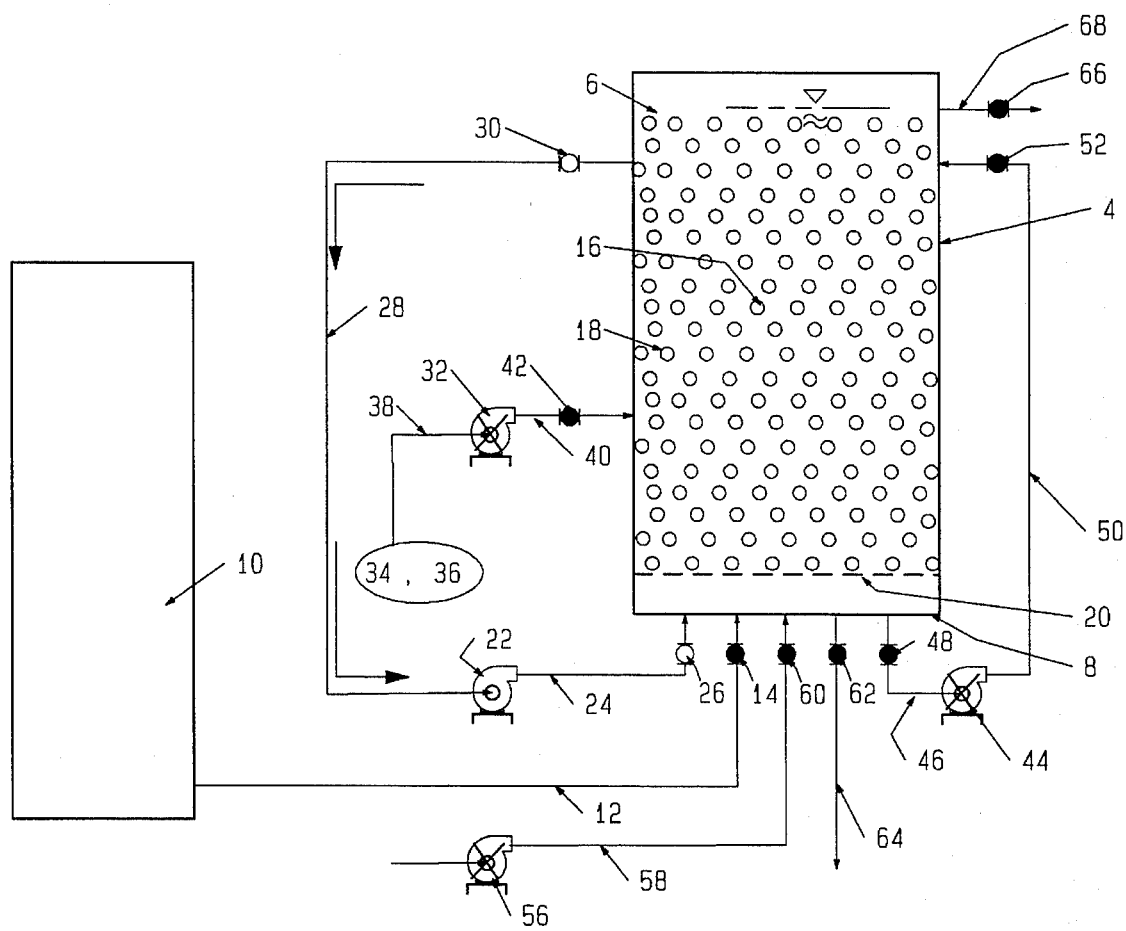
FIG. 5 is the schematic of FIG. 4 illustrating the chemical reaction.

After a predetermined quantity of the chemical 34 from tank 36 has been pumped out, the circulation utilizing the fluidization pump 22 is continued so that the media bed 16 is maintained in the fluidized mode until the reaction is completed. This is accomplished by closing valve means 42 and shutting-off the chemical feed pump 32 as seen in FIG. 5. The valve means 26 and 30 remain open, while the fluidization pump 26 continues to circulate the contents of the reactor, with the flow profile being from the bottom portion 8 to the top portion 6.

Figure 6:
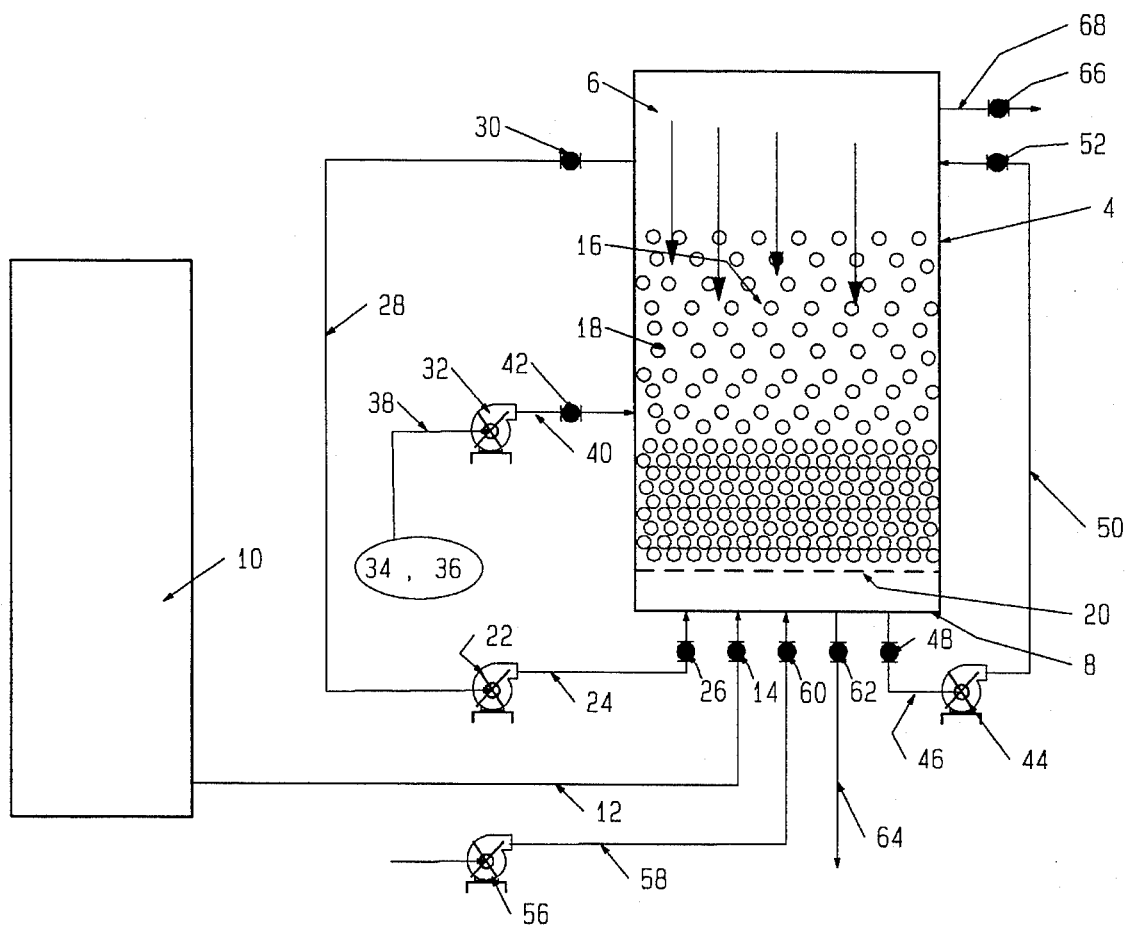
FIG. 6 is the schematic of FIG. 5 showing the settling of the media bed.

The next step is to terminate the circulation of the batch fluid, and hence terminate the fluidized state of the media bed 16. This is accomplished by deactivating the fluidization pump 22, as seen in FIG. 6. Also, valves 26 and 30 are closed. The media bed 16 is then allowed to settle. The particles in the settled bed are in contact with each other forming a filter bed.

Figure 7:
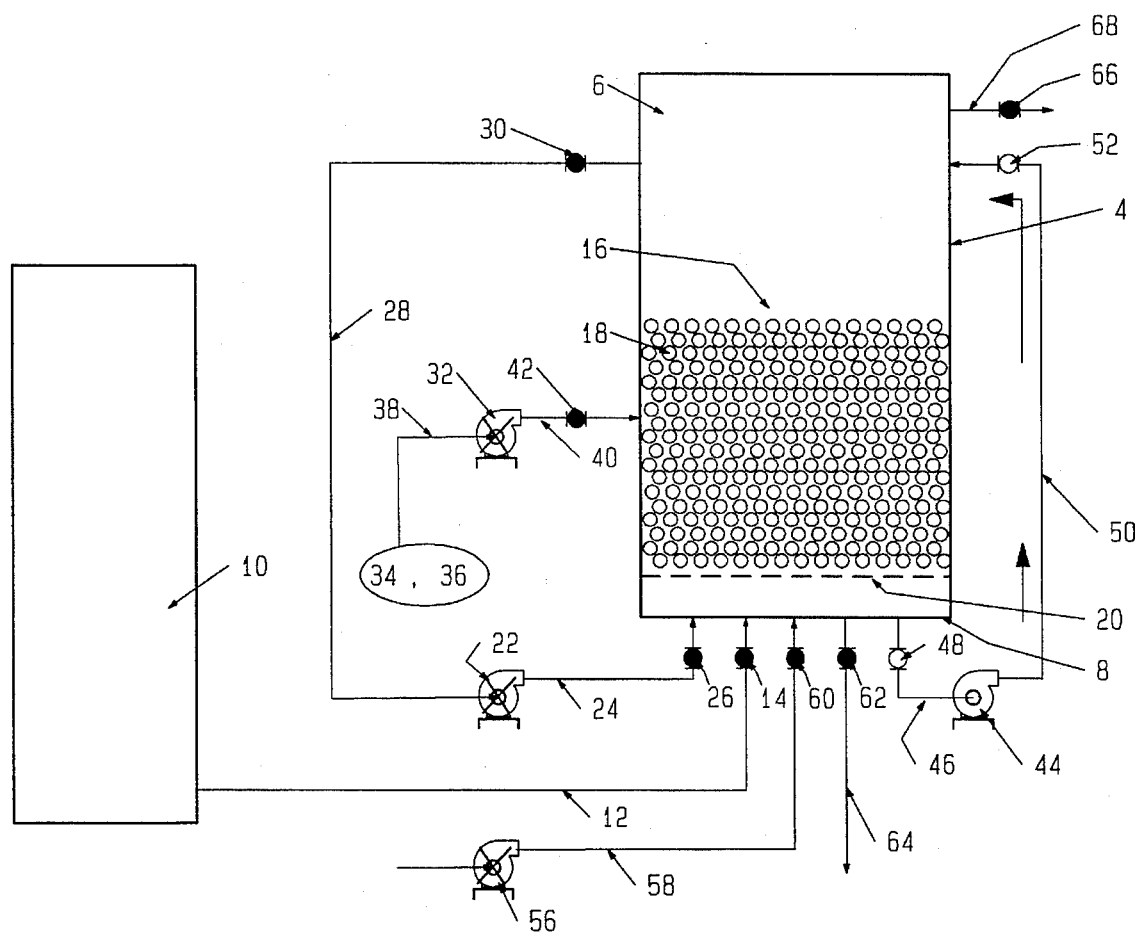
FIG. 7 is the schematic of FIG. 6 showing the recycling of the batch fluid.

Referring now to FIG. 7, the process would include the step of recycling the batch of fluid contained within the reactor 4. The step includes opening the valve means 48 and 52, and activating the pump means 44. Thus, the batch of fluid in the reactor is allowed to pass downward through the settled media bed 16 and be filtered by the bed 16. During this portion of the operational cycle, the media bed will not be completely settled, and the filtrate may not be sufficiently clear or filtered. Thus, the fluid is recycled to the top of the bed 16 in a flow from the top portion 6 to the bottom portion 8 i.e. down flow mode.

Figure 8:
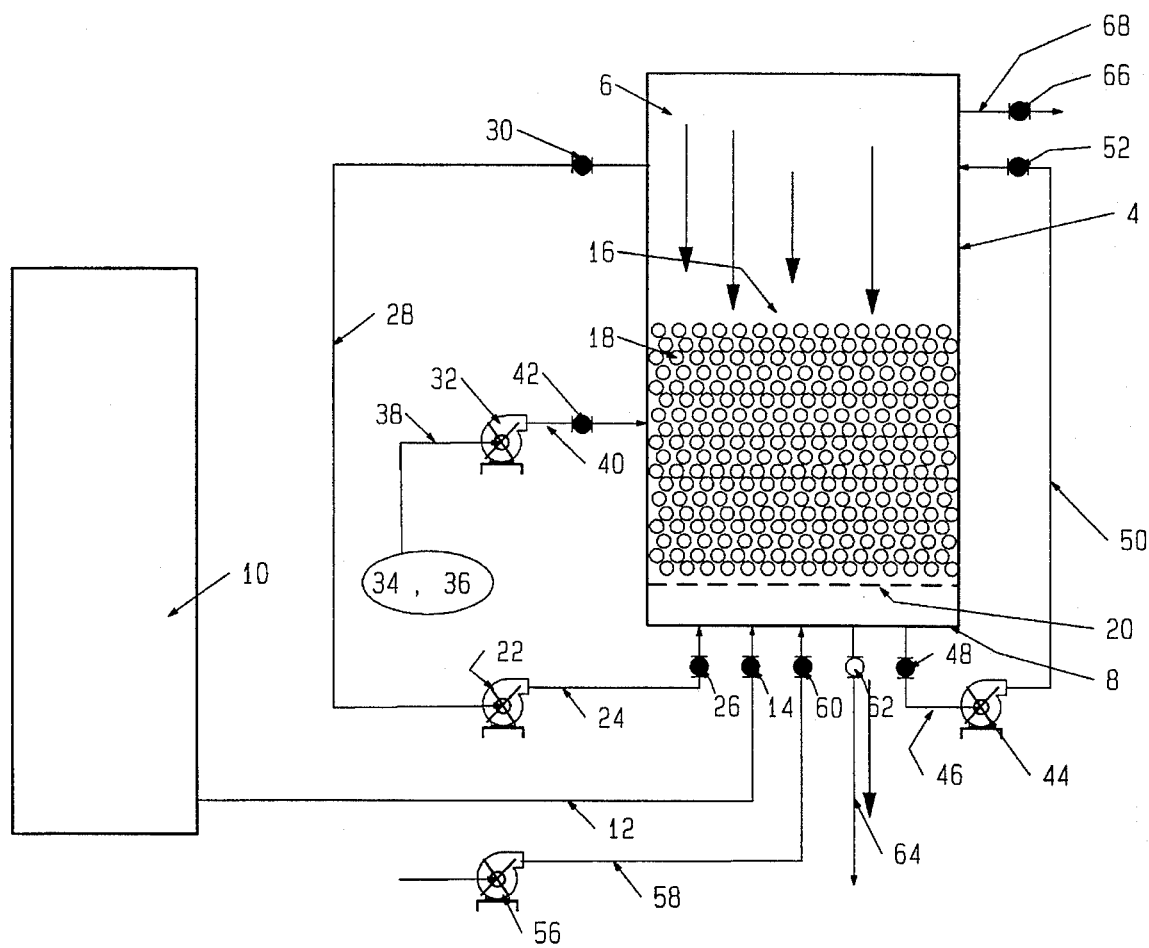
FIG. 8 is the schematic of FIG. 7 showing the filtration of the batch fluid.

The next step is illustrated in FIG. 8. In this step, the recirculation pump means 44 is deactivated, and the valve means 48 and 52 are closed. The valve means 14, 60, 42, 30, and 66 are also closed. The operator will position valve means 62 in the open position. Thus, the batch of fluid is allowed to flow downward through the media bed as seen in FIG. 8 by gravity means. It would be possible to force the batch fluid by pressure means such as by a pump. The fluid so drained is the batch fluid that has been reacted and filtered and now suitable for subsequent use or disposal.

In order to filter a new batch of fluid, the process starts again. More particularly, the process would require filling the reactor 4 as seen in FIG. 2. Next, the media bed is fluidized as seen and described in FIG. 3. Then, the chemical is added as depicted in FIG. 4. As seen in FIG. 5, the chemical is allowed to react. Next, the media bed 16 is allowed to settle as shown in FIG. 6. The next step is to recycle with the flow passing from the top to bottom as illustrated in FIG. 7. Finally, as seen in FIG. 8, the batch fluid is allowed to flow downward through the media bed 16.

Figure 9:
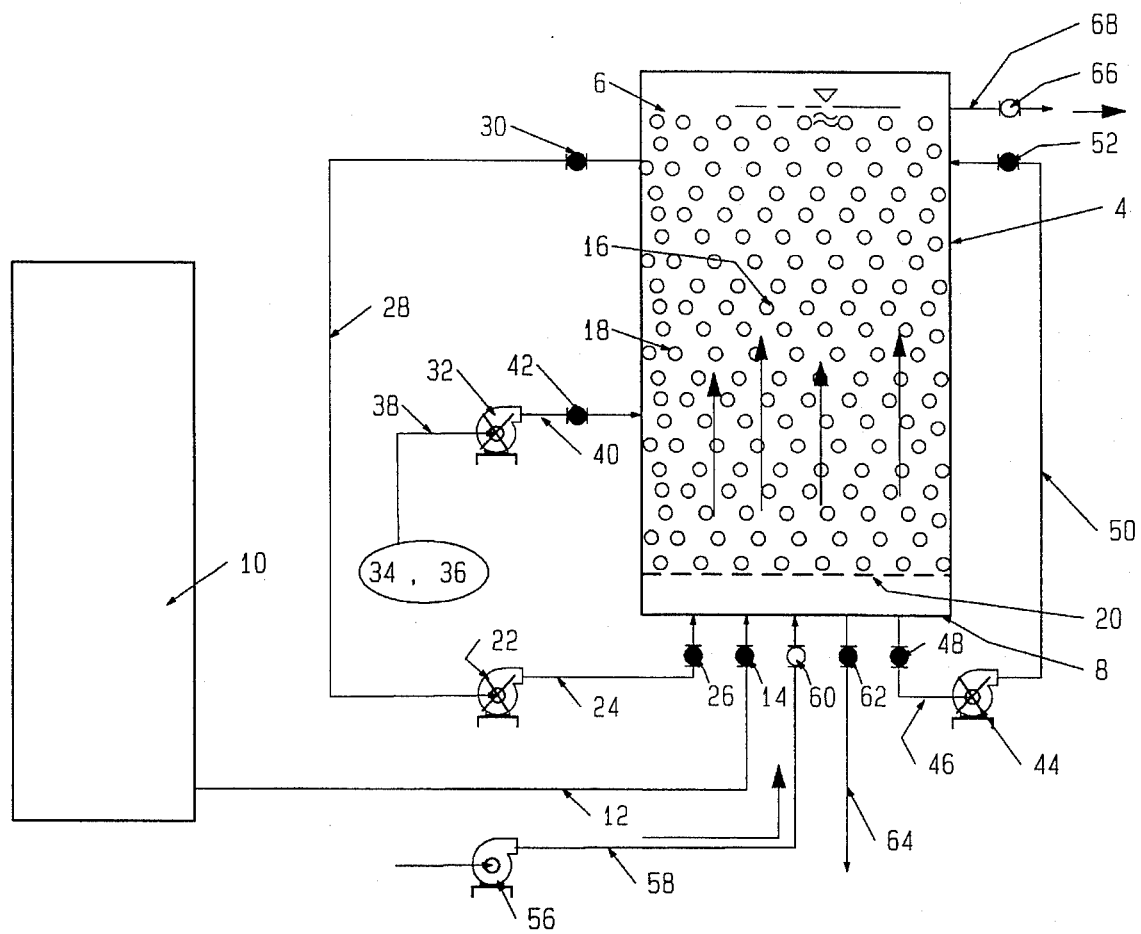
FIG. 9 is the schematic of FIG. 1 during a back washing cycle of the media bed.

During the process of reacting and filtering, the filter may retain solids generated during the reaction. The operator, therefore, may determine it is necessary to remove the excess residue from the media bed 16 from time to time. This is accomplished after the bed is drained as set out in FIG. 8 by backwashing the filter. The backwashing step is illustrated in FIG. 9.

Thus, the process would also include taking the cleaning fluid located within the cleaning fluid tank (not shown), opening the valve means 60 (at the bottom of reactor 4) and valve means 66 (at the top of the reactor 4). The backwash pump 56 is then activated so that an up flow mode is created. The flow rate velocity is sufficient to fluidize the media bed 16 as earlier described. The flow that exits the reactor via flow line 68 includes the cleaning fluid and any residue entrained with the cleaning fluid is process waste.

Using a rapid sand filter as an analogous process is useful in describing the filtering fluidized bed reactor. An important difference between a standard filter (i.e. rapid sand filter) and the present invention is that during the back wash cycle of a conventional filter, the filter bed is fluidized with water flowing upward through the filter bed. In the novel process disclosed herein, the cycle is essentially the same except that the back wash water is recirculated in a closed loop, chemicals are added to the water to cause a reaction, and the fluidized bed is used as a fluidized bed reactor.

Changes and modifications in the specifically described embodiments can be carried out without departing from the scope of the invention which is intended to be limited only by the scope of the appended claims.

I claim:

1. A method of treating an aqueous solution comprising the steps of:

providing a vessel with a media particle bed therein, the vessel having a top portion and a bottom portion;

filling said vessel with the solution to be treated;

circulating the solution through said vessel;

adding a second aqueous solution to said vessel so that a mixture solution is circulated;

precipitating a product from the reaction of said first aqueous solution with said second aqueous solution;

settling of said media particle bed and said product so that a filter bed is formed, collecting said mixture solution and said product at the bottom portion of said vessel, recycling said collected mixture solution and said product by introducing the collected mixture solution at the top portion of said vessel.

2. The method of claim 1 further comprising the steps of:

draining said mixture solution past said media particles within said vessel;

collecting a filtered solution at the bottom portion of said vessel.

3. The method of claim 2 further including a fluidization pump means, operatively associated with the bottom portion of said vessel, for fluidizing said solution within said vessel, and wherein the step of circulating said solution includes the steps of:

activating said fluidization pump;

fluidizing said solution.

4. The method of claim 3 including chemical feed pump means, operatively connected to said vessel, for pumping the second aqueous solution into said vessel, and wherein the step of adding the second aqueous solution into said vessel includes the steps of:

activating said chemical feed pump means;

injecting said second aqueous solution into said vessel so that said first aqueous solution and said second aqueous solution are reacted together so that the product is formed;

deactivating said chemical feed pump means;

continue circulating with said fluidization pump means.

5. The method of claim 4 including a recirculation pump means, operatively associated with the top portion of said vessel, for pumping said mixture solution into the top portion of said vessel, and wherein the step of recycling said collected mixture solution includes the steps of:

activating said recirculation pump means;

injecting said collected mixture solution into the top portion of said vessel.

6. The method of claim 5 further comprising the steps of:

introducing a cleaning fluid solution at the bottom portion of said vessel with a back wash pump means;

flowing said cleaning fluid solution from the bottom portion to the top portion of said vessel;

collecting said cleaning fluid solution at the top portion of said vessel.

7. A process for filtering a fluid comprising the steps of:

providing a media bed contained within a vessel, with said vessel having associated therewith:

a fluidization pump attached to the bottom portion; a chemical feed pump attached to said vessel; a recirculation pump having an inlet attached to the bottom portion and an outlet attached to the top portion;

furnishing said vessel with a batch of fluid;

circulating said batch fluid utilizing said fluidization pump so that the media bed is fluidized, wherein said fluidization pump is attached to the bottom portion of said vessel;

collecting said circulated batch fluid at the top portion of said vessel;

delivering said circulated batch fluid to said fluidization pump means for continued circulation within said vessel;

injecting a chemical solution utilizing said chemical feed pump;

reacting said chemical solution with said circulated batch fluid so that a product is precipitated.

8. The process of claim 7 further comprising the steps of:

terminating the circulation of said batch fluid by stopping said fluidization pump;

settling of said media bed particles so that a filter bed is formed.

9. The process of claim 8 further comprising the steps of:

activating said recirculation pump;

circulating said batch fluid and said chemical solution within said vessel;

collecting said batch fluid in the inlet of said recirculation pump located at the bottom portion of said vessel;

discharging said batch fluid from the outlet of said recirculation pump and delivering said batch fluid to the top portion of said vessel.

10. The process of claim 9 further comprising the steps of:

terminating said recirculation pump;

draining said batch fluid from said vessel by opening a valve at the bottom portion of said vessel.

11. The process of claim 10 wherein the step of draining said batch fluid includes:

attaching pressure means for delivering a pressure to said vessel;

pressuring said vessel so that said batch fluid is drained from the bottom portion.

12. The process of claim 10 wherein said vessel also has associated therewith a backwash pump, and the process further comprising the steps of:

providing a cleaning solution operatively associated with the backwash pump;

injecting the cleaning solution at the bottom portion of said vessel;

circulating said cleaning solution within said vessel;

recovering said cleaning solution at the top portion of said vessel.

13. A method of filtering a batch fluid comprising the steps of:

providing a vessel with a media particle bed therein, the vessel having a top opening, and a bottom opening;

filling said vessel with the batch fluid to be filtered;

activating a pump means, operatively associated with the top opening and the bottom opening, for pumping the batch fluid so that the batch fluid is circulated from the top opening to the bottom opening;

adding a chemical catalyst to said vessel;

mixing said chemical catalyst and said batch fluid by continuing to utilize said pump means;

precipitating a product from the reaction of said chemical catalyst with said batch fluid;

deactivating said pump means so that said media particle bed and said product is allowed to settle forming a filter bed;

collecting said mixture solution and said product at the bottom portion of said vessel;

activating said pump means in a reverse direction so that the collected mixture is recycled by collecting at the bottom opening and discharging at the top opening.

14. The method of claim 13 further comprising the steps of:

deactivating said pump means;

draining said mixture solution past said media particles within said vessel;

collecting a filtered solution from the bottom opening of said vessel.

* * * * *